United States Patent

Buck

[11] 3,814,449
[45] June 4, 1974

[54] HYDRAULIC RING CHUCK
[75] Inventor: James R. Buck, Ross Township, Kalamazoo County, Mich.
[73] Assignee: Ruck Tool Company, Kalamazoo, Mich.
[22] Filed: Oct. 5, 1972
[21] Appl. No.: 295,205

[52] U.S. Cl. ........................ 279/1 J, 279/4, 279/60
[51] Int. Cl. ........................................... B23b 31/30
[58] Field of Search .......... 279/1 DA, 1 DC, 1 J, 4, 279/60

[56] References Cited
FOREIGN PATENTS OR APPLICATIONS
1,068,144   5/1967   Great Britain ....................... 279/4

*Primary Examiner*—Francis S. Husar
*Attorney, Agent, or Firm*—Woodhams, Blanchard and Flynn

[57] ABSTRACT

A chuck construction comprising a chuck body having a first set of jaw carriers slidably mounted thereon and disposed for gripping engagement with the external surface of a ringlike workpiece. The chuck body has a second set of jaw carriers slidably mounted thereon and disposed inwardly of said first set for permitting gripping engagement with the internal surface of said workpiece. The jaw carriers are all mounted for movement in a direction having a component of motion extending radially of said chuck body. A piston is associated with each jaw carrier. The pistons associated with the first set of jaw carriers are in fluid communication with a pressure source to permit activation of said first set of jaw carriers. The pistons associated with the second set of jaw carriers are also connectible to a fluid pressure source. The individual jaw carriers of said first and second sets are relatively movable with respect to each other to permit same to compensate for workpiece eccentricity.

3 Claims, 3 Drawing Figures

PATENTED JUN 4 1974 3,814,449

HYDRAULIC RING CHUCK

FIELD OF THE INVENTION

This invention relates to a chuck construction and, more particularly, to an improved chuck construction having inner and outer sets of radially movable jaw carriers disposed for gripping engagement with inner and outer perpheries of a workpiece, respectively, with the individual jaws of each set being relatively movable with respect to each other to permit the jaws to compensate for workpiece eccentricity.

BACKGROUND OF THE INVENTION

Chuck constructions employing a plurality of radially movable jaw carriers disposed for gripping engagement with a workpiece have been extensively utilized. However, many of these prior chuck constructions have relied upon mechanical linkages connected between the jaw carriers and a power source for causing movement of the jaw carriers between operative and inoperative positions. The use of mechanical linkages has necessarily resulted in all of the jaw carriers being simultaneously moved through equal distances. These known jaw constructions, while advantageous in certain respects, have been unable to accurately compensate for workpiece eccentricity. Further, these known chuck constructions have been mechanically complex, thereby being relatively expensive to manufacture and maintain.

In situations where eccentric workpieces are to be machined, it is generally necessary to utilize a chuck construction having a plurality of slidable jaw carriers which can be individually adjusted to permit the jaws to compensate for the workpiece eccentricity. This is generally possible only through the use of chuck constructions having independently movable jaw carriers which are individually manually adjusted to thus clampingly coact with the workpiece. This type of structure, however, is highly undesirable since it requires substantial time and manual manipulation to permit the workpiece to be mounted on the chuck.

To overcome the above-mentioned disadvantages, various attempts have been made to provide a chuck construction having suitable structure associated with the jaw carriers for permitting simultaneous movement of same while at the same time permitting the jaw carriers to compensate for workpiece eccentricity. However, these prior devices, to the best of my knowledge, have been structurally and operationally complex.

Another disadvantage associated with the known chuck constructions has been their inability to permit workpieces, particularly collars and rings, to be easily machined on all surfaces thereof. The known chuck constructions permit only part of the workpiece surfaces to be machined when the workpiece is held within the chuck, whereupon the workpiece is released from the chuck and remounted in a different (or the same) chuck to permit the remaining workpiece surfaces to be machined. This is obviously a time consuming and inefficient operation, and also decreases the precision with which the various surfaces can be machined.

Accordingly, it is an object of the present invention to provide an improved chuck construction which overcomes the above-mentioned disadvantages. Particularly, it is an object of the present invention to provide:

1. An improved chuck construction which includes a plurality of jaw carriers actuated by a fluid pressure system and movable relative to one another to compensate for workpiece eccentricity.
2. A chuck construction, as aforesaid, wherein first and second sets of jaw carriers are movably mounted on a chuck body and are disposed for engagement with outer and inner surfaces of a workpiece, respectively, to permit machining of the inner and outer workpiece surfaces.
3. A chuck construction, as aforesaid, having means for enabling substantially all surfaces of a ringlike workpiece to be machined while said workpiece is mounted on said chuck construction.
4. A chuck construction, as aforesaid, wherein each set of jaw carriers is activated independently.
5. A chuck construction, as aforesaid, wherein the jaw carriers are substantially self-locking when disposed in engagement with the workpiece.
6. A chuck construction, as aforesaid, which can be manufactured simply and economically, which possesses a minimum number of parts, which is economical to maintain, which readily compensates for workpiece eccentricity, and which can be actuated to permit alternate gripping engagement with the inner and outer surfaces of the ringlike workpiece to permit machining of several workpiece surfaces.

These and other objects of the present invention will be apparent to persons acquainted with devices of this type upon reading the following specification and inspecting the accompanying drawings.

Figure 1:
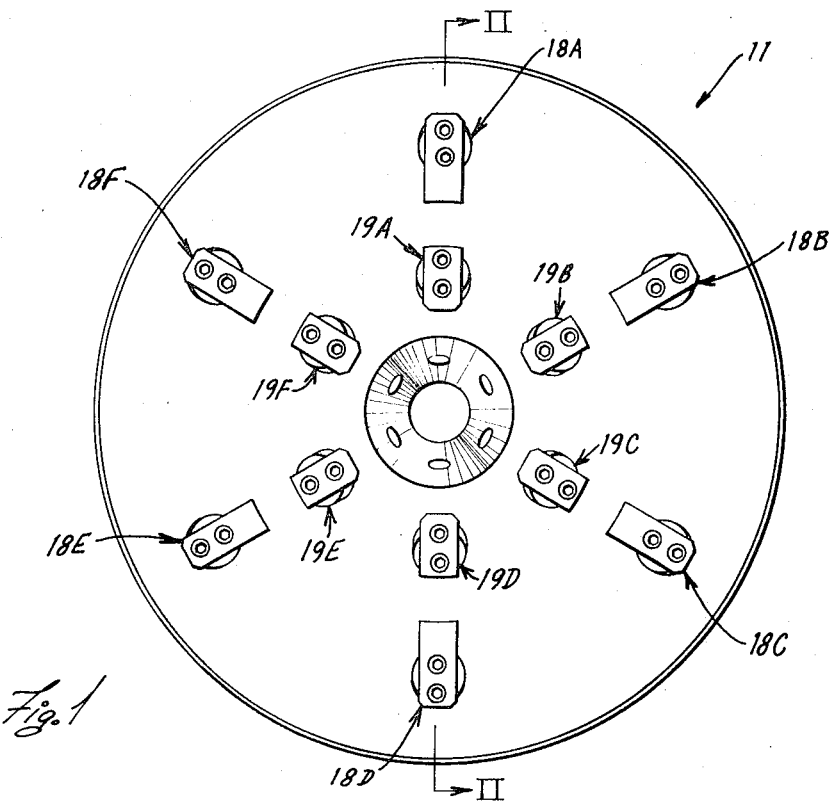
FIG. 1 is a front elevational view of a chuck construction according to the present invention, same being taken from the right side of FIG. 2.

Certain terminology will be used in the following description for convenience in reference only and will not be limiting. The words "upwardly," "downwardly," "rightwardly" and "leftwardly" will designate directions in the drawings to which reference is made. The words "forwardly" and "rearwardly" will refer to a direction axially away from the front or work engaging face of the chuck and to the opposite direction, respectively. The words "inwardly" and "outwardly" will refer to directions toward and away from, respectively, the geometric center of the chuck and designated parts thereof. Said terminology will include the words above specifically mentioned, derivatives thereof and words of similar import.

SUMMARY OF THE INVENTION

In general, the objects and purposes of the present invention are met by providing a chuck construction comprising a chuck body provided with first and second sets of jaw carriers slidably mounted thereon. The first set of jaw carriers is disposed in a pattern, as on a circle, which surrounds the second set. The individual jaw carriers are mounted for slidable movement in a direction having both radial and axial components of motion. The jaw carriers of the first set are each provided with a piston portion and are connected to a fluid source for permitting simultaneous activation of same to permit the jaw carriers to move radially inwardly into gripping engagement with an exterior surface of a workpiece. The jaw carriers of the second set also have piston portions which are disposed in communication with a pressure source for permitting simultaneous activation of the second set to move the jaw carriers radially outwardly into gripping engagement with an internal surface of a workpiece. The inner and outer sets of jaw carriers are designed for coaction with a ringlike workpiece and for holding same spaced outwardly from the front face of the chuck body to permit all surfaces of the workpiece to be machined. The inner and outer sets of jaw carriers each permit relative movement between the individual jaw carriers to compensate for workpiece eccentricity. The individual jaw carriers of each set are preferably mounted at an angle on the chuck body relative to the gripping engagement with the workpiece to enable the individual jaw carriers to be self-locked in opposition to the external forces imposed on the workpiece by a tool.

DETAILED DESCRIPTION

Figures 2, 3:
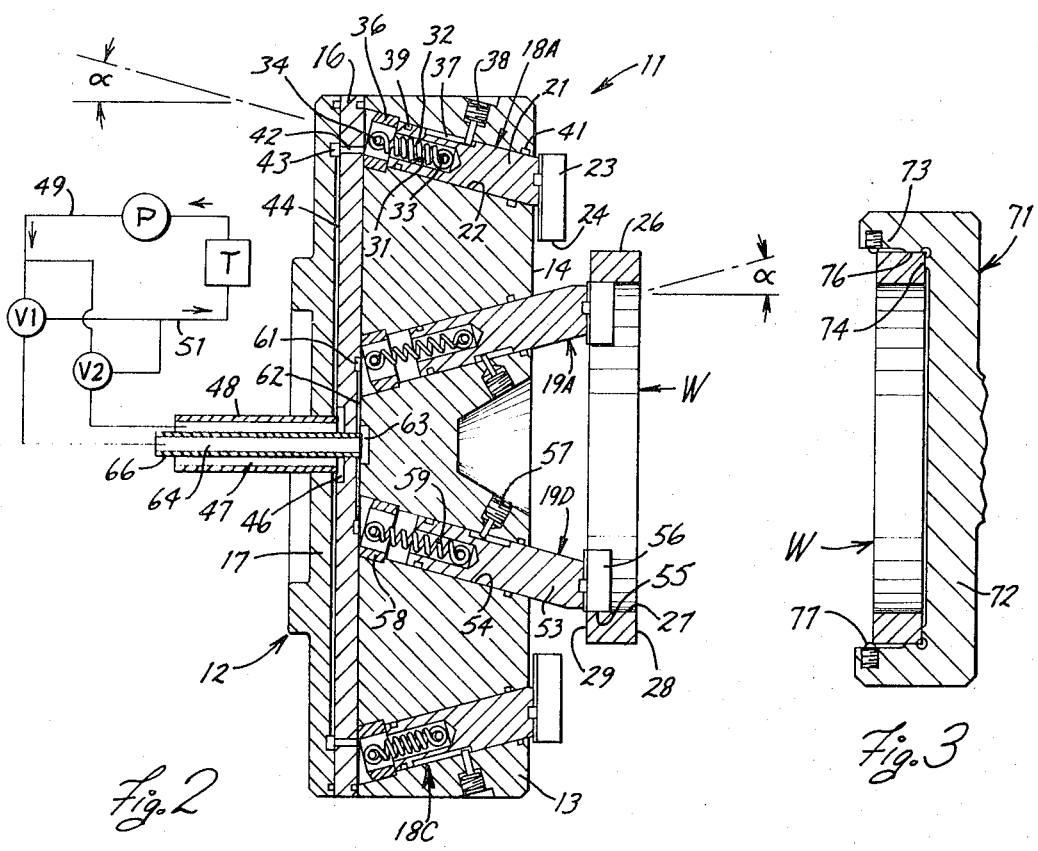
FIG. 2 is a sectional elevational view taken substantially along the line II—II of FIG. 1.
FIG. 3 is a fragmentary sectional view of a work locater used for holding the workpiece when same is being initially mounted on the chuck construction of the present invention.

FIGS. 1 and 2 illustrate therein an improved chuck construction 11 according to the present invention. The chuck construction 11 includes a chuck body 12 which, in the disclosed embodiment, is of a multipart construction. The chuck body 12 includes a substantially cylindrical main body portion 13 which defines the front face 14 of the chuck body. The rearward end of the main body portion 13 is fixedly connected to an intermediate housing plate 16, which in turn is fixedly connected to a rear mounting plate 17 adapted to be disposed in engagement with the surface of a suitable mounting member, such as the conventional face plate of a lathe.

The chuck construction 11 includes a first plurality of jaw carriers 18 slidably supported on the chuck body 12. The jaw carriers 18, which are all identical but have been given the reference letters A, B, C, D, E and F for identification purposes, are uniformly disposed within a circular arrangement which is substantially concentric with the rotational axis of the chuck body 12. The jaw carriers 18 will be hereinafter referred to as the outer jaw carriers.

The chuck construction 11 includes a second set of jaw carriers 19 which are also uniformly disposed within a circular arrangement which is substantially concentric with the rotational axis of the chuck body 12. The jaw carriers 19 are also substantially identical to one another and have also been given the reference letters A, B, C, D, E and F for identification purposes. The jaw carriers 19 of the second set are spaced radially inwardly of the jaw carriers 18 and will hereinafter be referred to as the inner jaw carriers.

Considering first the outer jaw carriers 18, each includes a substantially cylindrical piston portion 21 which is slidably disposed within a recess 22 formed in the chuck body 12. A jaw 23 is fixedly secured to the forward end of the piston portion 21. The jaw 23 is disposed forwardly of the housing front face 14 and has an inner gripping surface 24 adapted to be moved into gripping engagement with an external surface 26 of a workpiece W. The workpiece W in the illustrated embodiment comprises a ringlike member which also has an inner annular surface 27 and opposed axial end faces 28 and 29.

The rearward end of the piston portion 21 has a recess 31 formed therein. A conventional tension spring 32 is disposed within the recess 31 and has one end thereof fixedly anchored to a pin 33 which is fixedly secured to the piston portion 21. The opposite end of the spring 32 is anchored to a further pin 34 which is fixedly secured to a sleeve 36. The sleeve 36 is fixedly secured to the chuck body 12 adjacent the rearward end of the recess 22 and functions as a stop member for retaining the piston portion 21 in its rearward retracted position due to the urging of the spring 32.

The piston portion 21 is slidable longitudinally of the recess 22 and is guided by means of a key 38 which is stationarily mounted on the chuck body 12 and extends into an elongated guide groove 37 formed in the piston portion 21. The key 38 prevents rotation of the piston 21 in this embodiment and also limits the forward extension of the piston due to the key 38 contacting the shoulder defined at the rearward end of the slot 37. The piston portion 21 is also provided with a resilient seal ring 39 adjacent the rearward end thereof and disposed in sealing engagement with the wall defining the recess 22. A further resilient seal ring 41 is disposed adjacent the forward end of the housing, which seal ring 41 is disposed in slidable sealing engagement with the external periphery of the piston portion 21.

The piston portion 21 of jaw carrier 18 is slidably movable in a direction which lies within a plane which also contains therein the longitudinally extending axis of the chuck body 12. However, the direction of movement of the piston portion 21 extends at a small acute angle $\alpha$ relative to the longitudinal axis of the chuck body, the angle $\alpha$ being selected so that each jaw carrier 18 is substantially self-locking when disposed in gripping engagement with the workpiece. For this purpose, the included angle $\alpha$ is determined according to well known mathematical principles to result in the piston being self-holding or self-locking. For this purpose, the angle $\alpha$ is preferably selected to be approximately 14.0°, which angle is conventionally utilized throughout the machine tool industry to provide a self-holding taper.

The rearward end of each recess 22 communicates with the forward end of an axial passage 42 formed in the intermediate housing plate 16. The rearward end of each axial passage 42 in turn communicates with an annular groove 43 which is formed in the rear mounting plate 17 adjacent the interface of the plates 16 and 17. A plurality of substantially radially extending passages 44, as formed in the mounting plate 17, communicate with the annular ringlike groove 43 adjacent the outer ends thereof, with the inner ends of the passages 44 communicating with a small annular chamber 46 which is formed in the intermediate plate 16 directly adjacent the longitudinally extending axis of the chuck body. The chamber 46 communicates with one end of a flow passage 47 which is formed by a conduit 48. Flow through the conduit 48 is controlled by a conventional shiftable valve V2 which is connected to a supply conduit 49 which communicates with a conventional pump P and a discharge conduit 51 which is connected to a conventional storage tank or reservoir T. The reservoir T contains therein a substantially noncompressible pressure fluid, such as hydraulic fluid.

Considering now the inner jaw carriers 19, same are substantially identical to the outer jaw carriers 18 and thus will only be briefly described. Each jaw carrier 19 includes an elongated substantially cylindrical piston portion 53 slidably disposed within an elongated recess 54 formed in the housing chuck body 12. A jaw 56 is fixedly secured to the forward end of the piston portion 53, which jaw 56 is also disposed forwardly of the front face 14. The jaw 56 has a conventional gripping surface 55 adapted to be moved into gripping engagement with the inner surface 27 of the workpiece W.

The piston portion 53 is slidably guided within the recess 54 by means of a stationary key 57. The piston portion 21 is normally resiliently urged rearwardly of the chuck body by a tension spring 59, which spring normally maintains the jaw carrier 19 in a rearward retracted position wherein it abuts a stationary stop sleeve 58.

The piston portion 53 of the inner jaw carrier 19 is also slidably movable relative to the chuck body 12 along a direction which extends at a small acute angle relative to the longitudinal axis of the chuck body. For this purpose, the included angle between the direction of movement and the chuck axis is also preferably equal to the angle $\alpha$ and is selected to result in each jaw carrier 19 being self-locking or self-holding when disposed in gripping engagement with the workpiece W.

The inner jaw carriers 19, as briefly described above, are thus substantially identical to the outer jaw carriers 18 except that the inner and outer jaw carriers are tapered in opposite directions relative to the longitudinal axis of the chuck body, so that the included angle between the inner and outer carriers is thus approximately $2\alpha$. The only other significant difference between the inner and outer jaw carriers is that the gripping areas 24 on the outer jaw carriers are disposed on the radially inner ends of the jaws 23, whereas the gripping areas 55 of the inner jaw carriers are disposed on the radially outer ends of the jaws 56.

The rearward end of each recess 54 communicates with an annular ringlike groove 61 which is formed in the intermediate plate 16 at the interface between the main body portion 13 and the plate 16. Ringlike groove 61 in turn communicates with the radially outer ends of a plurality of substantially radially extending passages 62, which passages 62 at their inner ends communicate with a small chamber 63. Chamber 63 communicates with one end of a flow passage 64 defined within the interior of a conduit 66, which conduit 66 is connected to a conventional shiftable valve V1 for controlling the flow of pressure fluid through the conduit 66. The valve V1 is also connected to the supply conduit 49 and discharge conduit 51 for controlling the flow of pressure fluid from the pump P and to the tank T.

To facilitate the mounting of an annular workpiece W on the chuck construction 11, there is preferably provided a work locater for permitting the workpiece to be properly positioned on the machine tool. For this purpose, the chuck construction 11 of the present invention may be utilized in conjunction with the work locater 71 illustrated in FIG. 3. However, it must be recognized that numerous other work locaters could be utilized without departing from or effecting the successful utilization of the chuck construction 11 of the present invention.

The work locater 71, in the illustrated embodiment, includes a substantially annular support plate 72 having an annular axially extending flange 73 adjacent the outer edge thereof so as to define an internal recess adapted to receive therein the workpiece W. The support plate 72 and flange 73 have annular shoulders 74 and 76 thereon, respectively, which are adapted to abut against the workpiece W when same is properly positioned therein. The locater 71 has a plurality of spring-loaded retainer balls 77 mounted on the flange 73 and disposed circumferentially therearound, which balls 77 are spring urged outwardly to overlap the exposed axial face of the workpiece W to thus retain same in the locater 71.

OPERATION

The operation of the device according to the present invention will be briefly described to insure a complete understanding thereof.

Assuming that the chuck 11 is mounted on a machine tool, such as on the head stock of a lathe, all of the inner and outer jaw carriers will normally be retained in their retracted positions. A workpiece W, such as ring or collar, can then be mounted in the locater 71 which can be temporarily mounted on the tail stock of the lathe. The locater 71 containing the workpiece W therein can then be moved to position same closely adjacent the front face 14 of the chuck body 12. The valve V1 is then opened to permit pressure fluid as supplied by the pump P to flow through the supply conduit 49 into the conduit 66, whereupon the fluid flows into chamber 63, through radial passages 62 into the annular groove 61 and into the rearward end of the recesses 54. The pressure fluid which flows into the recesses 54 causes all of the inner jaw carriers 19 to be moved outwardly against the urging of the springs 59. Due to the slope of the jaw carriers in the direction of movement of the pistons 53, the jaws 55 are moved axially outwardly away from the front face 14 and are simultaneously moved radially outwardly relative to the chuck axis. The jaw carriers 19 are continuously moved outwardly until the gripping surfaces 55 on the jaws 56 move into secure gripping engagement with the inner surface 27 of the workpiece W. Since the plurality of the inner jaw carriers 19 are interconnected solely by the pressure fluid, the individual jaw carriers 19 move both relative to one another and independently of each other and will thus compensate for any eccentricity which may exist in the workpiece W. This insures that each jaw 56 is moved into secure gripping engagement with the workpiece W.

After all of the inner jaw carriers 19 have been moved into secure gripping engagement with the workpiece W, the locater 71 can be removed from the workpiece. While, if desired, the valve V1 can then be moved to a closed position to trap the fluid within the recesses 54, it will normally be preferred to keep the valve V1 open and thus maintain the pump pressure on the system and hence on the several jaw carriers.

With the workpiece securely gripped by the plurality of inner jaw carriers 19 substantially as illustrated in FIG. 2, suitable machining operations can then be performed on the exposed surfaces of the workpiece W. For example, the outer peripheral surface 26 and the axial end faces 28 and 29 can all be machined when the workpiece W is being gripped by the set of inner jaw carriers 19.

After the appropriate machining operations have been performed, the other valve V2 is then actuated to permit pressure fluid from pump P to flow through supply line 49 into the flow conduit 48. This fluid then flows from chamber 46 through the intermediate passageways 44 into the annular groove 43. Fluid within annular groove 43 then flows through axial passages 42 into the plurality of recesses 22. The outer jaw carriers 18 are thus caused to extend outwardly in opposition to the urging of the spring 32. The outward movement of the outer jaw carriers 18 also causes the jaws 23 to be simultaneously moved axially away from the front face 14 and radially inwardly relative to the chuck axis. This extension of the outer jaw carriers 18 causes the gripping surfaces 24 of the jaws 23 to be moved into secure gripping engagement with the outer peripheral surface 26 of the workpiece W. Since the workpiece is securely held by the inner jaws 56, the outer jaws 23 will move into secure gripping engagement with the workpiece to thus maintain same in a desired concentric relationship relative to the chuck axis. Further, since the plurality of outer jaw carriers 18 are interconnected solely by the pressure fluid, the individual jaw carriers 18 can move independently of and relative to one another if needed to compensate for any eccentricity of the workpiece, although since in this example these jaws are engaging a machined surface there will in this instance normally be little or no such compensation needed. Thus, again, all of the jaw carriers 18 will move into uniform gripping engagement with the workpiece W. Where the inner suface is to be machined first, then the outer jaws will compensate for any workpiece irregularities and the inner jaws will engage a machined surface.

After the workpiece W has been engaged and held by the jaws 23 of the outer carriers 18, the valve V2 can be moved to a closed position if it is desired to trap the fluid within the recesses 22 although, again, it will normally be preferred to keep the valve V2 open and maintain the pump pressure on the jaw carriers 18. The valve V1 can be reversed to permit the pressure fluid within the recesses 54 to flow backwardly through the conduit 48 into the discharge line 51 for return to the tank T.

When valve V1 is reversed, this results in depressurization of the fluid associated with the inner jaw carriers 19, whereupon the springs 59 then cause the individual jaw carriers 19 to be returned to their retracted position wherein the piston portions 53 abut the stop sleeves 58. The chuck construction is then in position to permit performance of a machining operation on the inner annular surface 27 of the workpiece W. Also, the axial end faces 28 and 29 can also be machined when the workpiece is gripped by the outer jaws 23, assuming that these surfaces have not been machined previously when the workpiece was held by the inner jaws 56.

After completion of all of the machining operations, the valve V2 is then reversed to relieve the pressure fluid associated with the outer jaw carriers 18, whereupon the springs 32 cause the outer jaw carriers 18 to be retracted, thereby completely releasing the finished workpiece W.

The inner and outer jaw carriers are preferably disposed at a small angle and relative to the chuck axis to assist in resisting the external force imposed on the workpiece by the tool. The self-holding angular relationship of the jaw carrier is thus able to resist the external force caused by the tool. However, when the tool force and the pressure force are both relieved, then the springs are capable of returning the jaw carriers to their retracted positions.

While the invention as described above utilizes six jaw carriers in both the inner and outer sets, it will be apparent that the number of jaw carriers can be selected in accordance with the rigidity of the workpiece being machined. Thus, when rather heavy workpieces are being machined, each set of inner and outer jaw carriers may contain only three jaw carriers, if desired, whereas use of the chuck construction according to the present invention on rather light pieces requires the use of a larger number of jaw carriers within each set to prevent undesired distortion of the workpiece when same is being gripped.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a compensating chuck construction for supporting a workpiece and particularly for supporting a ring-like workpiece to permit machining of all surfaces thereof, said chuck construction including a housing defining a longitudinally extending axis and having an end face disposed to face said workpiece, and inner and outer jaw systems movably supported on said housing for engaging said workpiece and supporting same adjacent said end wall, comprising the improvement wherein:

said inner jaw system includes
  a. a plurality of first recesses formed in said housing and angularly spaced around the axis thereof, each of said recesses extending on a first direction which is inclined at a small angle relative to said axis and converges with respect to said axis as said recess extends inwardly into said housing away from said end face,
  b. a plurality of first jaw carriers slidably mounted on said housing for sliding movement between an inoperative position wherein the jaw carriers are out of engagement with a workpiece and an operative position wherein the jaw carriers are disposed in engagement with the workpiece, one of said first jaw carriers being slidably supported within each of said first recesses and being movable in said first direction whereby each of said first jaw carrier is self-holding relative to said housing when engaged with said workpiece, each of said first jaw carriers having an end portion thereof projecting outwardly of said housing beyond said end face and having a workpiece-engaging jaw associated therewith, said workpiece-engaging jaw being movable axially away from said end face and radially outwardly away from said axis as said first jaw carrier is slidably moved from said inoperative position toward said operative position,
  c. first piston means associated with each of said first jaw carriers for causing slidable movement thereof from said inoperative position to said operative position;

said outer jaw system including
- a. a plurality of second recesses formed in said housing and angularly spaced around said axis, said plurality of second recesses being concentric with and spaced radially outwardly from said plurality of first recesses, each of said second recesses extending in a second direction which is inclined at a small angle relative to said axis and which diverges relative to said axis as said recess extends inwardly into said housing away from said end wall,
- b. a plurality of second jaw carriers slidably supported on said housing for sliding movement between an inoperative position wherein said second jaw carriers are out of engagement with a workpiece and an operative position wherein said second jaw carriers are disposed in engagement with the workpiece, one of said second jaw carriers being slidably supported within each of said second recesses and being movable in said second direction whereby each said second jaw carrier is self holding relative to said housing when engaged with said workpiece, each of said second jaw carriers including an end portion projecting from said housing outwardly beyond said end wall and having a workpiece-engaging jaw mounted thereon, said workpiece-engaging jaw being movable axially away from said end wall and radially inwardly relative to said axis as said second jaw carrier is slidably moved from said inoperative position toward said operative position,
- c. second piston means associated with each of said second jaw carriers for causing slidable movement thereof from said inoperative position toward said operative position;

first fluid passage means providing a common fluid connection between the plurality of first piston means for permitting pressure fluid to be supplied to said first piston means and for permitting relative movement between said first piston means to enable said first jaw carriers to compensate for workpiece eccentricity; and second fluid passage means providing a common fluid connection between the plurality of second piston means for causing movement of said second piston means and for permitting relative movement between said second piston means to enable said plurality of second jaw carriers to compensate for workpiece eccentricity;

the workpiece-engaging jaws associated with said plurality of first jaw carriers being spaced outwardly from said end wall when in said operative position, and the workpiece-engaging jaws associated with said plurality of second jaw carriers also being spaced outwardly from said end wall when in said operative position, whereby said workpiece can be rigidly supported in spaced relationship from said end wall for permitting all surfaces thereof to be machined.

2. A chuck construction according to claim 1, wherein each of said piston means is fixedly connected to its respective jaw carrier, and spring means connected between said housing and each of said first and second jaw carriers for normally resiliently urging each of said jaw carriers towards its inoperative position.

3. A chuck construction according to claim 2, wherein each of said first and second recesses extends at an angle of approximately 14° relative to said axis.

* * * * *